United States Patent [19]

Hassman

[11] 3,983,668
[45] Oct. 5, 1976

[54] FLOORING MEMBER
[76] Inventor: Ken Hassman, 267 Froom Cres., Regina, Saskatchewan, Canada
[22] Filed: Feb. 10, 1975
[21] Appl. No.: 548,762

[30] Foreign Application Priority Data
Feb. 12, 1974 Canada.............................. 192329

[52] U.S. Cl.................................. 52/177; 52/309; 52/602; 264/137; 425/93
[51] Int. Cl.².................... E04F 15/00; E04C 2/20
[58] Field of Search............ 52/177, 309, 602, 182, 52/188, 189, 190; 264/137; 425/93, 112

[56] References Cited
UNITED STATES PATENTS

| | | | |
|---|---|---|---|
| 3,213,570 | 10/1965 | Abramson........................ | 52/309 X |
| 3,335,429 | 8/1967 | Arp................................. | 52/309 X |
| 3,438,312 | 4/1969 | Becker et al..................... | 52/177 X |
| 3,583,117 | 6/1971 | Roach et al...................... | 52/309 |
| 3,846,945 | 11/1974 | Ruby................................ | 52/177 |
| 3,895,896 | 7/1975 | White et al...................... | 264/137 |

Primary Examiner—J. Karl Bell

[57] ABSTRACT

A flooring member for use in constructing a floor surface comprising an elongated structural member having at least one, relatively flat, vertically-extending support portion enabling said flooring member to withstand relatively heavy loads without substantial bending, said flooring member consisting essentially of glass fiber reinforcements and a suitable polyester. Preferably the member is constructed by pultrusion and includes a top portion having a substantially flat upper surface suitable for forming the floor surface, the support portion being integrally connected to the bottom of the top portion.

4 Claims, 6 Drawing Figures

FLOORING MEMBER

BACKGROUND OF THE INVENTION

This invention relates to flooring members and in particular to flooring suitable for heavy load areas and areas subject to conditions which normally give rise to corrosion or rot in normal materials.

It is of course well known to construct floors, both the actual floor surface and the underlying support structure, from such materials as wood or steel. However, these materials are becoming increasingly more expensive and hard to obtain, particularly wood. Also these materials are not suitable for some flooring purposes because of their tendency to rot or corrode. The use of other materials is often not practical because of the inability of other mterials to withstand heavy loads to which flooring members are often subject and because of the high cost of alternative materials. Also many materials which might conceivably be used cannot stand up to the heavy wear and tear that flooring must withstand.

One particular industry for which suitable flooring has been an unsolved problem for many years is the livestock and poultry industry and the related livestock transportation industry. The flooring in pens, feed lots, and livestock barns and in rail cars and trucks where livestock or poultry is kept on a continuing basis is subject to very corrosive or rotting conditions due to the urine and droppings of the animals which may give off highly corrosive ammonia gases, the high level of moisture from various sources, the hay and feed which is usually present, and the accompanying bacteria. Flooring made of wood or steel quickly deteriorates and must be replaced at high cost. The additional problem of course, at least with flooring for livestock, is that the flooring must be capable of withstanding very heavy loads because of the great weight of such animals which often tend to cluster in groups in a particular portion of the pen.

It is therefore an object of the invention to overcome to a large extent the above-mentioned problems by providing flooring members which are made from a combination of glass fiber reinforcements and polyesters. Members made from this material, particularly when constructed with the preferred pultrusion process, have great structural strength and are capable of withstanding loads such as those present in cattle pens. It is a further object of the invention to provide members which do not absorb moisture and therefore will not rot or corrode or breed bacteria and they are not affected by ammonia gases.

It is a further object to provide flooring members whose strength to weight ratio is high compared to known flooring members and which can be made in attractive, permanent colours.

Another advantage of the present flooring members is that they are also very resistant to wear and therefore have a very long life so as to make it quite economic over the life of the floor.

SUMMARY OF THE INVENTION

Accordingly the flooring member for use in constructing a floor surface of the present invention comprises an elongated, substantially rigid structural member having a flat horizontal top portion having a substantially flat upper surface suitable for forming a portion of said floor surface, said top portion having two longitudinal edges which project in free fashion and are supported only by said top portion, and a relatively flat, vertically extending support portion enabling said flooring member to withstand relatively heavy loads without undue bending, said flooring member being constructed bu pultrusion and consisting essentially of glass fiber reinforcements and suitable polyesters and said support portion being formed integrally with said top portion and located inwardly from said two longitudinal edges.

Other advantages and features of the present invention will become apparent from the following detailed description and the accompanying drawings.

DETAILED DESCRIPTION OF PREFERRED EMBODIMENTS

Figure 1:
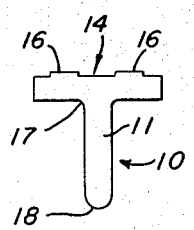
FIG. 1 is an end elevation of a preferred embodiment of the flooring member of the present invention.

The flooring members of the present invention and as shown in the drawings are for use in constructing a floor surface and in particular floors which are subject to conditions that are highly corrosive or give rise to rot. As explained earlier, an ideal use of the flooring members of the present invention is for flooring in livestock pens and in trailers used to transport livestock. Each flooring member 10 basically consists of an elongated structural member having at least one, relatively flat, vertically-extending support portion 11 which enables the flooring member 10 to withstand relatively heavy loads without undue bending. All of the flooring members of the present invention are made from a combination of glass fibre reinforcements and suitable polyesters which are well known in the fibreglass industry. However, such glass fiber reinforcements and polyesters have never been used until now to make flooring members and, in particular, flooring members constructed according to the present invention. Flooring members made from this material, as stated previously, are highly resistant to corrosion and rot since they do not absorb moisture or breed bacteria.

Figure 5:
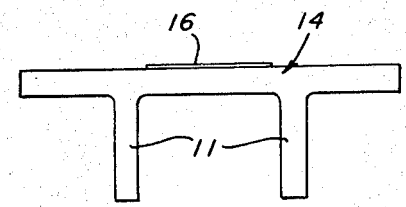
FIG. 5 is an end elevation of a further embodiment of the flooring member of the present invention.
Figure 2:
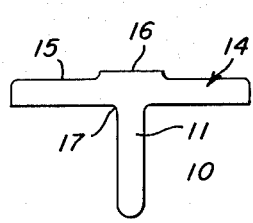
FIG. 2 is an end elevation of an alternative embodiment.
Figure 4:
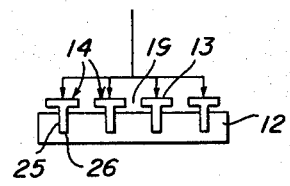
FIG. 4 is an end elevation of the floor of FIG. 3.
Figure 3:
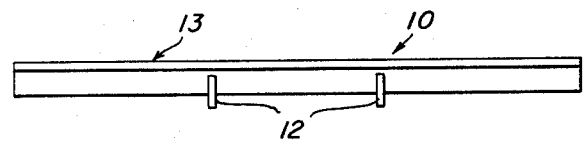
FIG. 3 is a side elevation of a floor constructed of the flooring members of FIG. 1, the members being supported centrally by two to five tie bars depending on the span.

The flooring members of the present invention may be constructed in a T-shape as shown in FIGS. 1 and 2 or they may consist simply of a flat strip to form the tie bars 12 shown in FIGS. 3 and 4. Alternatively, the flooring member of the present invention can be constructed with a double-T-shape as shown in FIG. 5. The T-shape members or the double T-shape members are the members which are used to form the actual floor surface 13 as shown in FIGS. 3 and 4 while the tie-bar members are used to connect the T-shaped members together and to support these members along their lengths.

Referring now to the embodiments of the invention shown in FIGS. 1 and 2, these flooring members each have a horizontal top portion 14 which in turn has a substantially flat upper surface 15 suitable for forming a portion of the floor surface. The support portion 11 is connected to the bottom of the top portion 14 so as to extend centrally along the length of the top portion 14. Preferably the support portion 11 and top portion 14 are formed integrally and at the same time by the pultrusion process described hereinafter. Typical dimensions of the flooring member shown in FIG. 1 might be 1 inch wide by 1 inch high and such a member might be shipped in lengths of from 20 feet to 24 feet to a fabrication depot where they can be cut to a particular length depending upon individual job requirements. The thickness of the support portion 11 could then be 0.188 inches and the thickness of the top portion 14, not including the height of the two ridges 16 described hereinafter, can also be 0.188 inches. The corners 17 formed between the top of the support portion 11 and the top portion 14 are preferably rounded as shown with a typical radius of one sixteenth of an inch. Also, the bottom edge 18 of the support portion 11 is preferably rounded along its entire length to form a semi-circle in cross-section.

In order to provide a floor surface which is less slippery than would otherwise be the case and which prevents skidding or sliding, the ridges 16 can be formed on the upper surface of the horizontal top portion 14. Two ridges can be formed along the entire length of the top portion as shown in FIG. 1 or, alternatively, one might merely have a single ridge as shown in FIG. 2. These ridges can be relatively flat as shown with a height of nearly 0.040 inches for example. Each ridge might have a width of approximately ¼ of an inch and be spaced ¼ of an inch from the adjacent ridge. Various forms of ridges are of course possible depending upon the particular use to which the flooring members are to be put.

The dimensions of the embodiment shown in FIG. 2 are typically the same as those of the embodiment of FIG. 1 except that the top portion is slightly wider being 1.75 inches for example and the single ridge 16 is twice as wide being ½ inch in width.

Referring now to the embodiment of the flooring member shown in FIG. 5, this embodiment has two, spaced apart support portions 11 with each being located inwardly from a long edge of the top portion 14 and extending along the length thereof. Such a flooring member could be constructed with the following dimensions. The total width of the top portion 14 is between 3 and 3½ inches while the height of the flooring member, not including the ridge 16, as 1 inch. Each support portion 11 is located a distance of from ¾ of an inch to 1 inch from the adjacent long edge of the top portion 14. As with the previously described members, the thickness of each of the support portions 11 and the top portion 14 is approximately 0.188 inches. The width of the ridge 16 is 1 inch.

Referring now to the floor structure shown in FIGS. 3 and 4, four of the T-shaped flooring members 10 of the present invention are arranged parallel to each other so that each edge of each top portion 14 is spaced a short distance from the adjacent edge of the adjacent top portion 14. This arrangement leaves elongated openings 19 between adjacent flooring members and is often highly desirable in livestock pens and in trailers or cars for transporting livestock. Obviously, such an arrangement permits the pen, trailer, or car to be cleaned with relative ease since the dirt, droppings, or other material simply drops through the openings 19 into an area where it can be easily picked up and removed. Obviously, the flooring members could be placed adjacent each other so that there are no openings 19, and so that a smooth, unbroken floor surface is formed. Such an arrangement would also have many advantageous uses, particularly where the openings 19 might cause problems or cannot be used.

In the flooring shown in FIGS. 3 and 4, each tie-bar 12 is formed with a slot 25 for each of the T-shaped flooring members being supported by the tie-bar. There could of course be up to five or more tie-bars or stringers depending on the span of the floor. Each slot 25 extends downwardly from the upper edge of the tie-bar to a point 26 located a suitble distance up from the bottom edge of the tie-bar. Each slot 25 has a width equal to or just slightly greater than the thickness of the support portion 11 of the flooring member to be inserted in the slot. Thus, the T-shaped flooring members are held firmly in place with respect to each other. The T-shaped flooring members may be spaced any suitable distance apart from each other such as from seven-sixteenths of an inch to 1 inch or more. Each tie-bar typically has a depth of 1½ inches.

Not shown in the drawings are the support means for the ends of the T-shaped flooring members and the ends of the two tie-bars 12. The ends of the support members, if being used in a building, could, of course, be supported in cement blocks, bricks, steel beams, or concrete. If the flooring is being used in a trailer or car for transporting cattle, for instance, the ends of the flooring members 10 or the tie-bars 12 are preferably supported in the metal frame of the trailer or car.

In lieu of having the slots 25 in the tie-bars 12, one could of course form these slots in the T-shaped members, in which case the tie-bars 12 would consist of a single, unbroken strip having no slots.

Once the T-shaped members 10 and the tie-bars 12 have been cut to the desired length at the fabrication depot, they will be transported to the job site where they are to be used. At the job site, the T-shaped members and the tie-bars can be assembled together to form "grate" sections such as that shown in FIGS. 3 and 4 wherein one is shown. Each section could have dimensions such as 1 foot by 2 feet, 2 feet by 2 feet, 2 feet by 3 feet, 2 feet by 4 feet, or 2 feet by 5 feet, depending on the dimensions of the area where the sections are to be placed. The sections are formed simply by placing the support portion 11 of each flooring member 10 in its proper slot 25 in each tie-bar for the section. Before doing so, a high density adhesive is placed along the walls of each slot 25 so that when the support portion 11 is inserted, the latter will be held firmly in place when the adhesive has had time to set. The adhesive can be applied with a mixing and metering dispensing gun if desired.

Each grate section can then be connected to adjacent grate sections in order to form the desired floor such as by means of a suitable PCV clip which will snap on or off of each grate section. These clips are made from a combination of glass and polyethylene or polypropylene.

Preferably each clip is capable of rigidly connecting together two adjacent T-shaped members by gripping each of their top portions 14 between two generally downwardly extending jaws. Each clip has two or more pairs of jaws which are connected together by an integral horizontal strip having a width of an inch or more. Each jaw extends the width of this strip and forms with the bottom surface of the strip a U-shaped channel opening inwardly towards the other jaw of the pair. This U-shaped channel accommodates with a snug fit the adjacent outer edge portion of the top portion 14 of the member when the latter is inserted into the clip.

Figure 6:
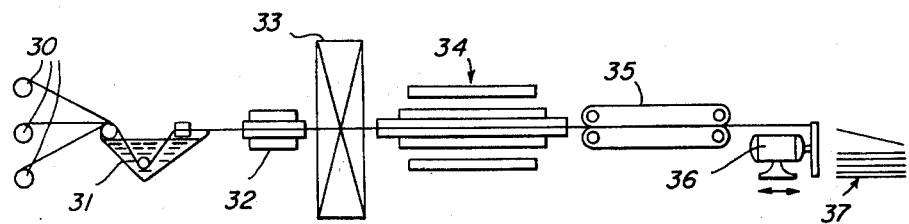
FIG. 6 is a schematic illustration of the preferred method of constructing the flooring member of the present invention.

The flooring members of the present invention are made from a process known in the fiberglass industry as pultrusion. Pultrusion can be defined as a process for producing a reinforced plastic profile in continuous lengths by pulling the raw materials through combining, shaping and curing operations. This process has been used in the past for making such products as electric insulators, guardrails, and fishing rods but it has never been used, up until the present time and the present invention, to produce strong, corrosion-resistance flooring members. There are many variations of the pultrusion process in existence and a number of these known processes can be used to form the flooring members of the present invention. A version of the pultrusion process which is preferred in order to form the flooring members of the present invention is shown in FIG. 6. Polyester which is a liquid thermosetting resin, is preferably combined with glass roving in the pultrusion process to form the flooring members. Glass roving is the most efficient and strongest form of glass fiber and is perhaps the easiest material to process in parallel orientation for the flooring members.

The glass roving is drawn from rolls 30, schematically shown in FIG. 6 whereupon it is fed through a polyester impregnating tank 31 filled with liquid polyester. The tank 31 may be 2 to 6 feet long and can be fitted out with side guides and wetout aids such as break bars, multiple orifices, or squeeze rolls. These devices (not shown) are well known in the art and operate under the liquid resin surface. They serve to expell air and promote wetting of the fiber which is necessary in order to obtain void free members with good properties. The impregnated fibers are then fed to a shape preformer 32 wherein the impregnated fibers are preformed to approximate the desired shape of the flooring member before molding occurs. The preformed fibers are then fed through a radio frequency cabinet or electronic box 33 and then through a steel die 34. The impregnated and preformed glass fibers are cured in the radio frequency cabinet 33 in a known manner. The steel die 34 of course gives the combined glass fibers their final shape, i.e. the T-shape of FIGS. 1 and 2. A puller 35 draws the shaped and cured product through the die 34. Simple belt type pullers are commercially available and satisfactory for smaller profiles. A cut-off machine 36 then cuts the continuous length of material being fed through the puller into short lengths 37 which can be easily handled or transported. Cut-off equipment for pultrusion lines are usually standard flying saw systems of a size to suit the profile.

It should be noted that curing of the flooring members may be effected by applying heat to the steel die 34 in lieu of using the cabinet 33 to cure the members.

A further detailed description of the process for making the flooring members of the present invention is deemed to be unnecessary since the pultrusion process is well known in the fiberglass product industry for making articles other than the flooring members of the present invention.

Example I

A T-shaped member having the dimensions of one inch by one inch and the profile shown in FIG. 1 of the drawings, which was constructed using the above described pultrusion process, had the properties set out in the following table:

| NOMINAL SIZE | WGT. PER FOOT | AREA | AXIS X – X | | | | | AXIS Y – Y | | |
|---|---|---|---|---|---|---|---|---|---|---|
| | | | I | $S_1 = \dfrac{1}{y_1}$ | $S_2 = \dfrac{1}{y_2}$ | r | $y_2$ | I | s | r |
| IN. | OZ. | IN.² | IN.⁴ | IN.³ | IN.³ | IN. | IN. | IN.⁴ | IN.³ | IN. |
| 1 × 1 | 4.6 | 0.36 | 0.031 | 0.093 | 0.044 | 0.30 | 0.71 | 0.016 | 0.033 | 0.21 |

The flexural modulus of this flooring member was 5×10⁶ P.S.I. while the structural strength of the member (the ultimate strength on the X—X axis) was 130,000 P.S.I.

What I claim as my invention is:

1. A flooring member for use in constructing a floor surface comprising an elongated, substantially rigid structural member having a flat horizontal top portion having a substantially flat upper surface suitable for forming a portion of said floor surface, said top portion having two longitudinal edges which project in free fashion and are supported only by said top portion, and a relatively flat, vertically-extending support portion enabling said flooring member to withstand relatively heavy loads without undue bending, said flooring member being constructed by pultrusion and consisting essentially of glass fiber reinforcements and suitable polyesters and said support portion being formed integrally with said top portion and located inwardly from said two longitudinal edges.

2. A flooring member according to claim 1 wherein said flooring member has at least one ridge formed on said upper surface to make said upper surface less slippery.

3. A flooring member according to claim 1 wherein there is only one support portion extending centrally along the length of said top portion.

4. A flooring member according to claim 1 wherein there is two, spaced-apart support portions with each being located inwardly from a longitudinal edge of said top portion and extending along the length of the flooring member.

* * * * *